United States Patent [19]
Dunnavant et al.

[11] 3,839,159
[45] Oct. 1, 1974

[54] SYSTEM FOR CONCENTRATING A MODERATING SOLUTION UTILIZED IN A PRESSURIZED WATER NUCLEAR POWER PLANT

[75] Inventors: Allan A. Dunnavant, Wallingford; Angelo R. Giardina, Broomall; Andrew M. Vargo, Aston; James L. Vota, Pittsburgh, all of Pa.

[73] Assignee: Westinghouse Electric Corporation, Pittsburgh, Pa.

[22] Filed: Nov. 30, 1971

[21] Appl. No.: 203,397

[52] U.S. Cl............... 202/160, 202/176, 202/177, 202/183, 202/186, 202/206, 203/10, 203/1, 203/2, 203/3, 203/42, 203/DIG. 18, 176/37
[51] Int. Cl........................ G21c 19/32, B01d 3/00
[58] Field of Search.................203/10, 1, 2, 3, 203/42, DIG. 18; 202/177, 176, 183, 185 A, 186, 199, 202; 176/37, 39

[56] References Cited
UNITED STATES PATENTS

| | | | |
|---|---|---|---|
| 2,504,464 | 4/1950 | Stanley | 203/2 |
| 3,158,556 | 11/1964 | Hopper | 202/160 |
| 3,342,702 | 9/1967 | Rijnsotorp | 203/2 |
| 3,378,450 | 4/1968 | Gramer et al. | 176/37 |
| 3,480,515 | 11/1969 | Goeldner | 203/90 |
| 3,501,384 | 3/1970 | Starmer | 202/176 |
| 3,563,861 | 2/1971 | Fletcher | 203/1 |
| 3,577,320 | 5/1971 | Randell | 203/2 |

*Primary Examiner*—Wilbur L. Bascomb, Jr.
*Attorney, Agent, or Firm*—F. J. Baehr, Jr.

[57] ABSTRACT

A system for concentrating a solution of boric acid solution to a predetermined concentration and stripping the radioactive gases from the solution. The system is generally operable so that there is a continuous feed of weak boric acid solution and a continuous discharge of pure water from the system during the concentrating portion of the cycle and the system is operable so that when the boric acid solution reaches a predetermined concentration, the weak acid feed and pure water discharge are shut off, the pure water is recirculated through the system until the boric acid of predetermined concentration is removed to storage tanks. The system has sequentially operated controls which minimize the thermodynamic shock as the system is switched from the recycle portion of the cycle to the distillate discharge portion of the cycle.

17 Claims, 1 Drawing Figure

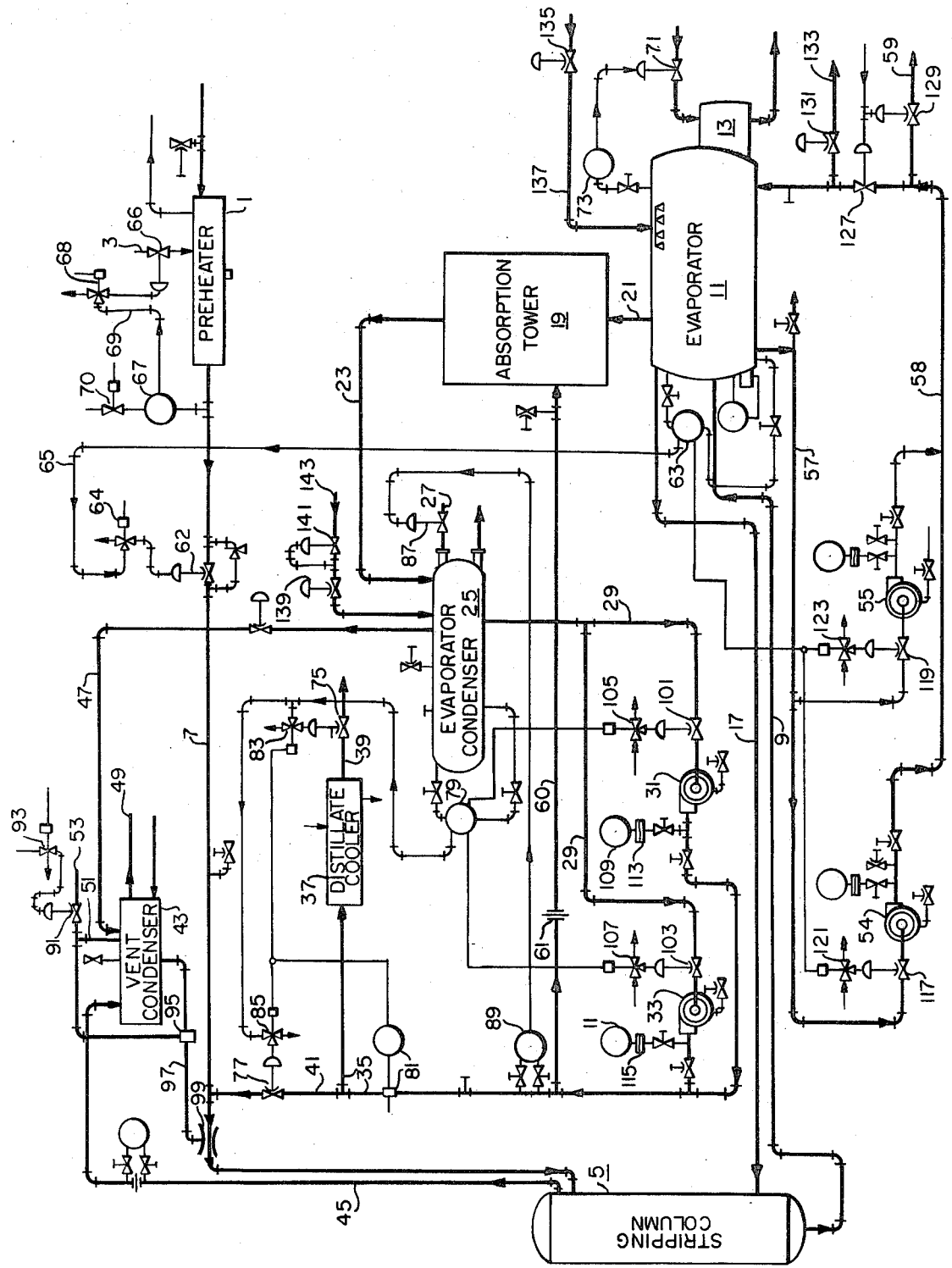

SYSTEM FOR CONCENTRATING A MODERATING SOLUTION UTILIZED IN A PRESSURIZED WATER NUCLEAR POWER PLANT

BACKGROUND OF THE INVENTION

This invention relates to nuclear reactors and more particularly to a system for concentrating a moderator utilized in a pressurized water nuclear reactor to assist in controlling the output of the reactor.

Boron, particularly isotope 10, has a large neutron capturing cross section, therefore a compound such as boric acid which contains boron and is soluble in water may be utilized as a moderator or chemical shim to supplement the use of control rods for adsorbing neutrons to control the power output of a pressurized water nuclear reactor.

The concentration of boric acid in the cooling or circulating water for the reactor is varied during the life of the core to match the burn out of the core or fuel. The concentration of boric acid may also be varied more rapidly to control more rapid changes in output of the reactor.

If such a system is utilized, a portion of the coolant is removed from the system and fed to an evaporator wherein the water is evaporated and the boric acid is concentrated to a predetermined concentration. The evaporated water is condensed and fed to a pure water storage tank and the concentrated boric acid is fed into another storage tank. The pure water and boric acid are supplied to the cooling system in the proper proportion to increase or decrease the concentration of boric acid in the cooling system thus increasing or decreasing the output of the reactor as required.

One of the disadvantages of such a system is that it produces radioactive gases which must be stripped from the system and collected so as not to add radioactive waste to the environment.

Another problem associated with such a system is that the quantity of coolant removed from the system must be small to make the system economical and this makes continuous control of such a small quantity of concentrated effluent at a particular concentration very difficult. Therefore, a batch concentrating system provides more accurate control, but introduces complex thermodynamic interactions which must be alleviated to provide a reliable operable and economical system.

SUMMARY OF THE INVENTION

In general a system for concentrating a moderating solution for a pressurized water nuclear reactor wherein the solution contains dissolved solids and dissolved and entrained gases, when made in accordance with this invention comprises a preheater from the influent solution utilizing a heating medium to heat the influent solution; a gas stripper for the preheated solution; an evaporator for degasified solution utilizing a heating medium, a portion of the solvent vapor produced by the evaporator being supplied to the gas stripper; a condenser for condensing the evaporated solvent not utilized by the gas stripper; and a vent condenser for condensing the vapor and cooling the gases stripped from the preheated fluid in the gas stripper and for condensing the vapor carried with the gases stripped from the fluid in the evaporator. Such a system also comprises a controller responsive to the flow of solvents from the condenser for controlling the flow of coolant to the condenser; a controller responsive to the quantity of solvent in the condenser for regulating the flow of solvent therefrom; a controller responsive to the quantity of solution in the evaporator for controlling the flow of solvent into the system; a controller responsive to the pressure in the evaporator for controlling the flow of heating medium to the evaporator; and a controller responsive to the temperature of the solution leaving the preheater for controlling the quantity of heating medium being supplied to the preheater. The above-mentioned apparatus and controls are cooperatively associated to produce generally continuous flow of the influent solution and generally continuous flow of the effluent solvent during one portion of the cycle and intermediate flow of the solution having a predetermined concentration during another portion of the cycle with a minimum amount of thermodynamic shock during the change-over from one portion of the cycle to the other.

BRIEF DESCRIPTION OF THE DRAWINGS

The objects and advantages of this invention will become more apparent from reading the following detailed description in connection with the accompanying drawing, in which the sole FIGURE is a flow diagram of a boric acid concentrating system made in accordance with this invention.

DESCRIPTION OF THE PREFERRED EMBODIMENT

Referring now to the sole drawing in detail, there is shown a system for concentrating a moderating solution such as boric acid utilized as the coolant in a nuclear reactor (not shown) to absolve neutrons and thereby reduce the power level of the core of the reactor. The number of neutrons dissolved depends on the concentration of the boric acid which is varied by bleeding off a small amount of the coolant into the evaporating system shown which discharges pure distillate, solvent or water into one tank (not shown) and boric acid at a predetermined concentration, approximately 12 percent, into another tank (not shown). The discharge of the boric acid is intermittent or by batches in order to establish precise control of the concentration of the boric acid.

The pure water and concentrated boric acid are added to the reactor coolant system in the proper proportions to increase or decrease the concentration of boric acid, thus raising or lowering the output of the reactor. Being a batch concentrating system requires unique controls, which will be discussed in detail hereinafter, to overcome the complex thermodynamic interaction between various components of the system.

As shown in the drawing the system comprises an influent solution or weak acid preheater 1 through which the influent solution flows and is heated by a heating medium such as steam fed through the conduit 3. The preheated influent solution is fed to a gas stripping column 5, wherein entrained or dissolved radioactive gases are removed. Conduit 7 connects the preheater with the stripping column 5.

After passing through the stripping column 5 the preheated influent solution flows through conduit 9 to an evaporator 11. A heating medium such as steam is supplied to a submerged coil portion 13 of the evaporator via conduit 15.

Vapor or evaporated solvent from the evaporator 11 returns to the stripping column 5 via conduit 17 and flows to an absorption tower 19 via conduit 21. The vapor flows upwardly through a plurality of trays and other devices in the absorbing tower to remove any boric acid volatiles and entrained liquids carried over with the vapor and then flows through a conduit 23, which is in communication with an evaporator condenser 25.

Vapor flowing into the shell portion of the evaporator condenser 25 is cooled by a coolant supplied via conduit 27, which circulates through tubes in the evaporator condenser 25. The vapor is thus condensed forming pure solvent, distillate or water. The distillate flows downwardly via conduit 29 to a pair of pumps 31 and 33 either of which pump the distillate through conduit 35 to a distillate cooler 37. Distillate leaving the distillate cooler 37 flows via conduit 39 to a distillate or pure water storage tank (not shown). Alternately, the distillate may be recirculated through the system via conduit 41 which is connected to conduit 7. A vent condenser 43 for condensing the vapor or water carry over with the non-condensible gases is placed in fluid communication with the stripping column 5 and with the evaporator condenser 25 via conduits 45 and 47, respectively. Cooling water is supplied to the vent condenser via conduit 49 and off gases are discharged via conduit 51 to a vent header 53, which also collects the radioactive gases from other sources.

To recirculate the boric acid during the concentrating portion of the cycle and to discharge the concentrated boric acid, recirculating pumps 54 and 55 are connected to the evaporator 11 via a suction conduit 57 and a discharge conduit 58. The discharge conduit 58 is also connected to a storage tank (not shown) for concentrated boric acid via conduit 59.

Distillate is supplied to the absorption tower via conduit 60 which is in fluid communication with conduit 35 and orifice 61 is disposed in conduit 60 to regulate the flow of distillate reflux to the absorbing tower 19.

To provide a reliably operable and economical system a unique control system hereinafter described was devised.

A flow control valve 62 is disposed in conduit 7 to regulate the flow of weak boric acid flowing into the system. The control valve 62 is controlled by a controller 63 responsive to the liquid level in the evaporator 11 and opens as the controller 63 senses low liquid level in the evaporator 11. A solenoid valve 64 is disposed in an instrument air conduit 65 and is operable upon receiving an electrical signal to vent the instrument air to the atmosphere to open control valve 62.

A steam control valve 66 is disposed in conduit 3 to regulate the quantity of steam flowing to the preheater. A controller 67 is responsive to the temperature of the weak boric acid solution leaving the preheater and operates the control valve 66 to control the flow of steam to the preheater and thus the temperature of the weak acid leaving the preheater.

A solenoid valve 68 is disposed in an instrument air conduit 69 connecting the controller 67 to the control valve 66 and is operated by an electrical signal to vent the conduit 69 to atmosphere and open the control valve 66. A solenoid valve 70 is disposed in the instrument air supply conduit feeding the controller 67 to shut off instrument air to the controller 67 so that the controller will not operate during a portion of the cycle.

A steam control valve 71 is disposed in conduit 15 to regulate the quantity of steam flowing to the evaporator 11. A controller 73 is responsive to the pressure in the evaporator 11 and operates the control valve 71 to control the flow of steam to the evaporator and thus the pressure on the shell side of the evaporator 11.

Control valve 75 and 77 are disposed in conduits 39 and 41, respectively. A controller 79 is responsive to the quantity of liquid in the evaporator condenser 25 and operates the control valve 75 and 77 to control the liquid level in the evaporator condenser 25.

A conductivity cell 81 is disposed in conduit 35 and is responsive to the concentration of dissolved solids in the distillate flowing through conduit 35 to operate solenoid valves 83 and 85 at the same time causing the control valve 75 to open, when the concentration of dissolved solids in the distillate is below a predetermined level, to discharge the distillate to the pure water storage tank and to cause the valve 77 to close, and to operate the solenoid valve 83 and 85 to cause control valve 77 to open when the concentration of dissolved solids in the distillate is above a predetermined level causing the distillate to recirculate through the system.

Control valve 87 is disposed in conduit 27 to regulate the quantity of cooling water flowing to the coil of the evaporator condenser 25. A controller 89 responsive to the quantity of distillates flowing through the conduit 35 operates the control valve 87 to increase or decrease the quantity of cooling water circulated through the coil of the evaporator condenser 25 and thus the quantity of vapor condensed therein.

A control valve 91 is disposed in conduit 51 to control the flow of gases to the gas header 53. Solenoid valve 93 is operable in response to an electrical signal to open and close the control valve 91 to connect or disconnect the vent condenser 43 with the vent header 53. A trap 95 is disposed in conduit 97 and is adapted to drain only liquid from the vent condenser 43. The liquid from the trap 95 flows through conduit 97 to an eductor 99 which is disposed in conduits 77 to return the condensate from the vent condenser to the system.

Control valves 101 and 103 are disposed in conduit 29 adjacent the suction of the pumps 31 and 33, respectively. The control valves 101 and 103 may be closed remotely from a switch which operates solenoid valves 105 and 107 to vent instrument air being fed to the diaphragms of the valves 101 and 103. The controller 79 responds to an extremely low level of liquid in the evaporator condenser to shut down the pumps 31 and 33.

Pressure gauges 109 and 111 indicate the discharge pressure of the pumps 31 and 33, respectively, and have diaphragms 113 and 115 separating the operating fluid for the gauges from the fluid being discharged by the pumps.

Control valves 117 and 119 are disposed in conduit 57 adjacent the suction of pumps 53 and 55, respectively. The control valves 117 and 119 may be closed remotely from a switch located on a control panel by operating solenoid valves 121 and 123 to vent the instrument air being supplied to the diaphragms of valves 117 and 119, respectively, to close the valves.

Control valves 127 and 129 are disposed in conduits 58 and 59, respectively, and are connected to the same instrument air supply so that when one valve opens the other valves closes. Thus, when valve 127 is open the concentrated solution is recirculated through the evaporator 11 and when valve 129 is open the concentrated solution is transferred to the concentrated boric acid storage tank.

Control valve 131 is disposed in a conduit 133, which serves as a drain for the evaporator 11. The control valve 133 is remotely operated from the control panel.

Control valve 135 is disposed in a conduit 137, which supplies flushing water to the evaporator 11.

Control valve 139 and pressure regulator valve 141 are disposed in conduit 143 supplying inert gas to the evaporator condenser 25. The control valve 139 is remotely operated from the control panel and is uitlized to pressurize the evaporator condenser 25 to provide sufficient NPSH for the distillate pumps 31 and 33 when it is desirable to pump out the evaporator condenser.

The system is generally operable to produce batches of boric acid of a predetermined concentration of approximately 12 percent. The operation is as follows during the concentrating portion of the cycle. Weak or unconcentrated boric acid solution is fed into the system through the preheater 1. The outlet temperature is maintained at approximately 215°F. by the temperature controller 67. The preheated solution then flows to the stripping column 5 via conduit 7. In the stripping column 5 the preheated solution flows downwardly over packing or saddles while vapor from the evaporator 11 flows upwardly removing entrained and dissolved gases from the preheated solution. The gases and some vapor flow upwardly through conduit 45 to the vent condenser 43 wherein the vapor is condensed and the gases are vented to the vent header 53. The condensed vapor flows downwardly through conduit 97, the trap 95 and into the eductor 99 which reintroduces the condensate into the system.

After passing through the stripping column 5 the preheated solution has the majority of the gases removed and it flows via current conduit 9 to the evaporator 11. The pressure in the shell 5 of the evaporator 11 is controlled as approximately 3 pounds per square inch gauge, which is approximately 1 psi above the pressure of the vent header as a portion of the vapor generated in the evaporator 11, as hereinbefore mentioned is supplied to the stripping column 5. The solution is recirculated by one of the circulating or concentrates pumps 53 or 55. The remaining vapor produced in the evaporator 11 flows upwardly through trays in the absorbing tower 19 to remove entrained liquid and volatile carried over with the vapor and then the vapor flows into the evaporator condenser 25 wherein it is condensed. The condensate, distillate, or pure water is picked up by one of the condensate pumps 31 or 33 and if sufficiently pure, as determined by the conductivity cell 81, the pure distillate passes through the distillate cooler 37 and is discharged into the pure water storage tank. If the purity is below a predetermined value the distillate is recycled flowing through conduit 41 to conduit 7 wherein it is mixed with the influent preheated weak boric acid.

Gases liberated from the solution in the evaporator 11 pass through the absorption tower 19 along with the vapor and into the evaporator condenser wherein they are separated from the vapor and then the gases flow via conduit 47 to the vent condenser 43 wherein the remaining vapor is removed before the gases are vented into the vent header 53.

Thus, during the concentrating portion of the cycle there is generally a continuous flow of influent solution and a continuous discharge of distillate or pure water and radioactive gases.

When the concentration of the boric acid in the evaporator reaches a predetermined concentration generally 12 percent, the control valve 62 is closed by operating the solenoid valve 64 to vent the control air from the diaphragm of the control valve 62 shutting off the flow of weak boric acid into the system. The control valve 77 is switched over to be controlled by the controller 79 while the control valve 75 is switched off the controller 79 and closed. The instrument air to the temperature controller 67 is shut off by operating solenoid valve 70 stopping the controller 67 from following the temperature of the solution in conduit 7 and the steam control valve 66 is closed by operating the solenoid valve 68. The vent condenser vent valve 91 is closed, the steam valves 71 to the evaporator bundle is closed and the operating concentrate pump 54 or 55 is stopped. As the latent heat is removed in the evaporator condenser 25 the temperature of the concentrated boric acid in the evaporator 11 decreases. When the concentrated boric acid temperature reaches a predetermined level, generally 165°F, the cooling water to the evaporator condenser is turned off with the cooling water control valve 87. The nitrogen inlet valve 139 is then opened and the entire system is pressurized to 5 psig as determined by the preset nitrogen regulator valve 141. The concentrate pump 54 or 55 is then started and the system is ready for the concentrate to be pumped to the storage.

The concentrated boric acid of the proper concentration is then transferred to the storage tank by opening control valve 129 and closing control valve 127. When the desired amount of concentrated boric acid solution is removed from the system the operating concentrates pump 54 or 55 is stopped and control valve 129 is closed.

To switch from recycle to distillate discharge the operator merely operates one switch which initiates two timing cycles and operates the solenoid valve 64 to open the control valve 62 allowing weak boric acid solution to begin to flow into the system and close the vent control valve 91 by operating the solenoid valve 93 to prevent gases from the header 53 from backing up into the system. After lapse of the first time intervals, approximately 65 seconds, the solenoid valves 83 and 85 are operated switching the control of valves 75 to the level controller 79 and closing valves 77. However, the conductivity cell 81 can override this switchover if the purity of the distillate is not above a predetermined value.

The solenoid valve 70 is operated to allow instrument air to flow to the controller 67 and the solenoid valve 68 is operated to switch the control valve 66 back to the control of the temperature controller 67.

After a lapse of a greater time interval, approximately 2 minutes, the solenoid valve 93 is operated to open the vent control valve 91 again venting gases from the vent condenser 43 to the vent header 53.

The system hereinbefore described advantageously satisfies the dual requirement of low manufacturing costs with minimum operator participation and high reliability. It provides a compact arrangement, wherein adequate stripping steam is available through all modes of operation including the severe condition during switchover from recycle to discharge, while producing pure distillate and boric acid of a predetermined concentration stripped of radioactive gases. The controls also cooperate with the system to prevent excessive flashing in the stripping column, insure a minimum quantity of steam for stripping at all times and prevent backflow of contaminating gases from the vent header utilizing off the shelf equipment and instruments arranged in new and unique manner.

What is claimed is:

1. A system for concentrating a moderating solution for a pressurized water nuclear reactor, wherein the solution contains dissolved solids and dissolved and entrained gases, said system comprising:

means for preheating the influent solution utilizing a heating medium, means for removing gases from the preheated solution, means for evaporating solvent from the degasified solution utilizing a heating means, a portion of the solvent vapor produced by the evaporating means being supplied to the gas removing means, first condensing means for condensing the evaporated solvent not supplied to the gas removing means, second condensing means for condensing solvent from the gases which are collected from the gas removing means and from the first condensing means, control means responsive to the flow of solvents from the first condensing means for controlling the flow of coolant to the first condensing means, control means responsive to the quantity of condensed solvent in the first condensing means for regulating the flow of condensed solvent therefrom, control means responsive to the quantity of solution in the evaporating means for controlling the flow of solution flowing into the system, means for controlling the pressure in the evaporating means by regulating the flow of heating medium to the evaporating means, control means responsive to the temperature of the solution leaving the preheating means for controlling the quantity of heating media being supplied thereto, said above-mentioned apparatus and controls being cooperatively associated to produce a system for concentrating a moderating solution wherein one portion of the cycle there is a generally continuous flow of influent solution and a continuous flow of effluent solvent and gases, and during another portion of the cycle, there is an effluent flow of the solution having a predetermined concentration and the system is switched from one portion of the cycle to the other with a minimum amount of thermodynamic disturbance in the apparatus.

2. A system as set forth in claim 1 and further comprising means for absorbing the solute being carried over with the evaporated solvent prior to the evaporated solvent entering the first condensing means.

3. A system as set forth in claim 1 and further comprising means for cooling the effluent solvent flowing from the first condensing means.

4. A system as set forth in claim 1 and further comprising control means responsive to the purity of the effluent solvent from the first condensing means for returning the solvent to the system, when the concentration of the dissolved solids in the solution is above a predetermined value.

5. A system as set forth in claim 1 and further comprising means for shutting off the flow of effluent gases from said second condensing means.

6. A system as set forth in claim 5 and further comprising overriding means for overriding the control means responsive to the temperature of the solution flowing from the preheating means, the control means responsive to the quantity of solution in the evaporating means, and the means for shutting off the flow of effluent gases from the second condensing means, to provide the proper sequence of operation for returning the system from a portion of the cycle in which concentrated solution of the desired concentration is recycled, to a portion of the cycle wherein the solution is being concentrated and distillate is being discharged.

7. A system as set forth in claim 1 and further comprising means for supplying inert gas to the first condensing means.

8. A system as set forth in claim 1, wherein the evaporating means comprises means for recirculating and discharging concentrated solution.

9. A system as set forth in claim 1 and further comprising means for discharging the condensed solvent from the first condensing means.

10. A system as set forth in claim 1 and further comprising control means responsive to the purity of the condensed solvent being discharged by the first condensing means to recycle the condensed solvent through the system if it is below a predetermined purity and to discharge condensed solvent from the system if it is above a predetermined purity.

11. A system for concentrating a moderating solution for a pressurized water nuclear reactor, wherein the solution contains dissolved solids and dissolved and entrained gases, said system comprising:

means for preheating the influent solution utilizing a heating medium, means for removing gases from the preheated solution, means for evaporating solvent from the degasified solution utilizing a heating means, a portion of the solvent vapor produced by the evaporating means being supplied to the gas removing means, means for condensing the solvent vapor not supplied to the gas removing means, control means for controlling the flow of coolant to the condensing means, control means for regulating the flow of condensed solvent from the condensing means, control means responsive to the liquid level in the evaporating means for controlling the flow of solution flowing into the system, means for controlling the evaporating means by regulating the flow of heating medium to the evaporating means, control means responsive to the temperature of the solution leaving the preheating means for controlling the quantity of heating media being supplied thereto, said above-mentioned apparatus and controls being cooperatively associated to produce a system for concentrating a moderating solution where in one portion of the cycle there is a generally continuous flow of influent solution and a continuous flow of effluent solvent and gases, and during another portion of the cycle, there is an effluent flow of the solution having a predetermined concentration and the system is switched from one portion of the cycle to the other with a minimum amount of thermodynamic disturbance in the apparatus.

12. A system as set forth in claim 11 and further comprising means for absorbing solute being carried over with the evaporated solvent prior to the evaporated solvent entering the condensing means.

13. A system as set forth in claim 11 and further comprising means for cooling the effluent solvent flowing from the condensing means.

14. A system as set forth in claim 11 and further comprising control means responsive to the purity of the effluent solvent from the condensing means for returning the solvent to the system, when the concentration of the dissolved solids in said solvent is above a predetermined value.

15. A system as set forth in claim 11, wherein the evaporating means comprises means for recirculating and discharging concentrated solution.

16. A system as set forth in claim 11 and further comprising means for discharging the condensed solvent from the condensing means.

17. A system as set forth in claim 11 and further comprising control means responsive to the purity of the condensed solvent being discharged by the condensing means to recycle the condensed solvent through the system if it is below a predetermined purity and to discharge solvent from the system if it is above a predetermined purity.

* * * * *